United States Patent
Tsukada

(10) Patent No.: US 8,855,371 B2
(45) Date of Patent: Oct. 7, 2014

(54) COLOR IMAGE PROCESSING METHOD, COLOR IMAGE PROCESSING DEVICE, AND COLOR IMAGE PROCESSING PROGRAM

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 13/702,637

(22) PCT Filed: Jun. 28, 2011

(86) PCT No.: PCT/JP2011/003681
§ 371 (c)(1),
(2), (4) Date: Dec. 7, 2012

(87) PCT Pub. No.: WO2012/001949
PCT Pub. Date: Jan. 5, 2012

(65) Prior Publication Data
US 2013/0083969 A1    Apr. 4, 2013

(30) Foreign Application Priority Data

Jun. 30, 2010 (JP) ................................ 2010-149234

(51) Int. Cl.
*G06K 9/00* (2006.01)
*G06T 5/00* (2006.01)
*H04N 1/62* (2006.01)
*G06T 15/50* (2011.01)

(52) U.S. Cl.
CPC ......... *G06K 9/00* (2013.01); *G06T 2207/10024* (2013.01); *G06T 5/005* (2013.01); *H04N 1/628* (2013.01); *G06T 2207/30201* (2013.01); *H04N 1/62* (2013.01)
USPC ............................ 382/103; 382/274; 345/426

(58) Field of Classification Search
CPC .................................. G06K 9/00; G06T 15/50
USPC ......... 382/100, 103, 107, 118, 162–168, 173, 382/181, 189–194, 199, 232, 254, 264, 274, 382/276, 286–291, 305, 312; 358/1.9; 348/308; 345/426
See application file for complete search history.

(56) References Cited

U.S. PATENT DOCUMENTS 7,016,075 B1 *  3/2006  Tsukada .................... 358/1.9
7,218,324 B2 *  5/2007  Pfister et al. ............ 345/426

(Continued)

FOREIGN PATENT DOCUMENTS

JP    2001052144 A    2/2001
JP        3264273 A    4/2001

(Continued)

OTHER PUBLICATIONS

The international search report for PCT/JP2011/003681 mailed on Aug. 16, 2011.

(Continued)

*Primary Examiner* — Seyed Azarian
(74) *Attorney, Agent, or Firm* — Sughrue Mion, PLLC

(57) ABSTRACT

An object area detection means detects an object area which is an area to be subjected to image processing from an input image. A reflection component reconstruction means calculates color information of the object area and a perfect diffusion component, which is a low-frequency component of the object area, and reconstructs a surface reflection component based on the color information and the low-frequency component. A surface reflection component correction means corrects the reconstructed surface reflection component according to a reference surface reflection component that is the surface reflection component set in advance according to the object area. A reproduced color calculation means calculates a reproduced color that is a color obtained by correcting each pixel included in the input image by using the perfect diffusion component and the corrected surface reflection component and generates an output image based on the reproduced color.

7 Claims, 6 Drawing Sheets

(56) References Cited

U.S. PATENT DOCUMENTS

| | | | |
|---|---|---|---|
| 7,319,467 B2 * | 1/2008 | Weyrich et al. | 345/426 |
| 2005/0285860 A1 | 12/2005 | Pfister et al. | |
| 2005/0285960 A1 * | 12/2005 | Purcell et al. | 348/308 |
| 2006/0227137 A1 | 10/2006 | Weyrich et al. | |
| 2009/0141976 A1 * | 6/2009 | Tsukada | 382/167 |

FOREIGN PATENT DOCUMENTS

| | | |
|---|---|---|
| JP | H10229499 B1 | 7/2002 |
| JP | 2003317084 A | 11/2003 |
| JP | 2004045189 A | 2/2004 |
| JP | 2005222405 A | 8/2005 |
| JP | 2006004432 A | 1/2006 |
| JP | 2006023921 A | 1/2006 |
| JP | 2006277748 A | 10/2006 |

OTHER PUBLICATIONS

Hosoi Toshinori, Suzuki Tetsuaki, and Sato Atsushi, "Face Detection based on Generalized Learning Vector Quantization", FIT2002, I-30, Sep. 2002.

Tajima Johji, "Image Engineering Series 10, Color Image Duplication Theory, Basics of Color Management", Maruzen Corporation, Sep. 30, 1996, p. 33-39.

Ishiyama Rui, "Recognition of Non-Frontal Facial Images by Pose Conversion using General 3D Face Model", Proceedings of the IEICE (Institute of Electronics, Information, and Communication Engineers) General Conference 2007, D-12-085, 2007, p. 201.

Masato Tsukada et al., "Face Image Enhancement Based on 3D and Spectral Information", FIT2009 Dai 8 Kai Forum on Information Technology Koen Ronbunshu, separate vol. 3, Aug. 20, 2009, pp. 273-274.

Takahiro Okabe, Yoichi Sato, "Separation of Reflection Components Based on Frequency Characteristics of Bidirectional Reflectance Distribution Functions", IPSJ SIG Notes, Sep. 12, 2002, vel.2002, No. 84, pp. 1-8.

Rui Ishiyama, Masato Tsukada, "Specularity Removal for Enhancing Face Recognition under Variable Pose and Illumination", FIT2009 Dai 8 Kai Forum on Information Technology Koen Ronbunshu, separate vol. 3, Aug. 20, 2009, pp. 111-112.

* cited by examiner

INPUT IMAGE

COLOR IMAGE PROCESSING METHOD, COLOR IMAGE PROCESSING DEVICE, AND COLOR IMAGE PROCESSING PROGRAM

TECHNICAL FIELD

The present invention relates to image processing on color images, and more particularly to a color image processing method, a color image processing device, and a color image processing program for performing image processing that improves the texture of an object in a color image that is actually captured using an imaging device.

BACKGROUND ART

As a technique of improving the quality of a color image captured by a color image capturing device, various techniques of making the color of a specific object (for example, flesh color, green of plants, and a blue sky) in a color image closer to the memory color of the object have been proposed. The use of these methods enables desirable colors to be reproduced.

For example, Patent Literature 1 discloses a technique of correcting the color of color images. In an automatic color correction method disclosed in Patent Literature 1, a representative color is extracted from a correction target area in an image, and the representative color is compared with a predetermined central color for correction to determine RGB correction parameters. Moreover, each pixel is corrected by controlling application strength of the correction parameters according to the distance between the pixels in the image and the central color.

Specifically, in the method disclosed in Patent Literature 1, the hue, saturation, and lightness of the respective pixels are calculated from the RGB values which are the color information of the respective pixels. Moreover, the distance between the color of each pixel in a color space and the central color for correction is calculated, and the correction strength is adjusted according to the distance. In this way, the color of an object is intensively corrected.

In this technique, color correction is performed based on the addition and subtraction of correction parameters in the RGB color space. For example, in the case of flesh color of a human face, the RGB correction amount is calculated for each pixel according to the distance between each color and the central color for correction. If the whole face area is lightened, a correction parameter corresponding to the distance from the central color for correction is added to or subtracted from the RGB values of each pixel located in substantially the entire face area.

Patent Literature 2 discloses a technique of detecting a face area in an input image. According to an eye detection method disclosed in Patent Literature 2, even if it is not possible to discriminate eyes from the other portions due to deficient features when a single eye is evaluated, the eyes and the other portions are discriminated using an evaluation value of a pair of eyes based on the features of the pairs of eyes.

In addition to the above patent literatures, Patent Literatures 3 to 5 disclose techniques related to color image correction processes. Patent Literature 3 discloses a color correction device and method in which when color correction is performed on image data of spectral colors, the color space of the spectral colors is converted into a color space having a lower dimension than the original dimension, color correction is performed in the low-dimensional color space, and spectral colors of an appropriate dimension are generated from the spectral colors of the lower dimension.

Patent Literature 4 discloses a color conversion method of converting an original color space into a target color space between color systems having different reference white colors without changing the way in which colors are viewed. Specifically, in the color conversion method disclosed in Patent Literature 4, the spectral distribution characteristics of the original reference white color are reconstructed from the color temperature of the original reference white color which is the reference white color of the original color space. Moreover, the spectral distribution characteristics of the target reference white color are reconstructed from the color temperature of the target reference white color which is the reference white color of the target color space. Further, the surface reflectance of an optional color in the original color space is reconstructed using the tristimulus values of the optional color, the spectral distribution characteristics of the original reference white color, and the color matching functions of the human beings. Furthermore, the tristimulus values which are the colors in the target color space are obtained based on the reconstructed surface reflectance, the reconstructed spectral distribution characteristics of the target reference white color, and the color matching functions of the human beings.

Patent Literature 5 discloses a technique of automatically performing favorable color correction with respect to an important subject in an image of the nature, captured under various illumination environments. Specifically, in the color correction method disclosed in Patent Literature 5, a body surface color of a specific object is extracted, and optimal color correction parameters are set for the extracted body surface color. Color correction conversion that is applied to only a specific color is performed using the parameters. By performing such conversion, it is possible to automatically perform color correction with respect to an important subject in the image of the nature captured under various illumination environments.

Moreover, Patent Literature 6 discloses a technique of generating a skin reflection model of a human face to apply the model to rendering of a facial image. In the method disclosed in Patent Literature 6, first, the human face is scanned using a 3D scanner to acquire a 3-dimensional shape. In this case, a plurality of facial images is acquired by illuminating the face from different directions and different viewpoints. Moreover, a total reflectivity and a normal map are estimated using the surface scan data and the image data. Moreover, the total reflectivity is divided into two components of an under-surface scattering component and a (specular) surface reflection component, and a diffusion reflection is estimated based on these components. Further, the under-surface reflection is scanned using a fiber-optic spectrometer to obtain a transmittance map.

In Patent Literature 7, an image processing method is disclosed in which a pixel value of each pixel configuring an image is divided into a surface reflection light component according to surface reflection on a 3-dimensional object and a diffused reflection light component according to diffuse reflection, and at least one of the surface reflection light component and the diffused reflection light component is changed. In the image processing method disclosed in Patent Literature 7, a reflection model is divided into a surface reflection light component and a diffused reflection light component using a reflection model (hereinafter, referred to as a Klinker's division method) of Klinker and the others. Then, each divided reflection component is changed by using a Phong illumination model, a Lambertian reflection model, or the like.

Further, Non Patent Literature 1 discloses a face detection method using generalized learning vector quantization. Moreover, Non Patent Literature 2 discloses a face detection method using generalized learning vector quantization in which an image-based face detection method and a feature-based face detection method of detecting eye are combined.

Moreover, as a method of obtaining a 3-dimensional shape of the face, in addition to the method that uses a 3D scanner disclosed in Patent Literature 6, a method of reconstructing the face information of a 3-dimensional shape (3-dimensional information) from a 2-dimensional facial image is also known (for example, Non Patent Literature 3).

The contents disclosed in Patent Literatures 1 and 2 and the contents discloses in Non Patent Literatures 1 to 2 are appropriately referenced in the exemplary embodiments of the present invention.

CITATION LIST

Patent Literature

PLT 1: Japanese Patent No. 3264273
PLT 2: Japanese Patent Application Laid-Open (JP-A) No. 2003-317084
PLT 3: JP-A No. 2004-45189
PLT 4: JP-A No. 10-229499
PLT 5: JP-A No. 2001-92956
PLT 6: JP-A No. 2006-277748
PLT 7: JP-A No. 2001-52144

Non Patent Literature

NPL 1: Hosoi Toshinori, Suzuki Tetsuaki, and Sato Atsushi, "Face Detection based on Generalized Learning Vector Quantization", FIT2002, I-30, September 2002
NPL 2: Tajima Johji, "Image Engineering Series 10, Color Image Duplication Theory, Basics of Color Management", Maruzen Corporation, Sep. 30, 1996, p. 33-39
NPL 3: Ishiyama Rui, "Recognition of Non-Frontal Facial Images by Pose Conversion using General 3D Face Model", Proceedings of the IEICE (Institute of Electronics, Information, and Communication Engineers) General Conference 2007, D-12-085, 2007, p. 201

SUMMARY OF INVENTION

Technical Problem

As in the color correction method described in Patent Literature 1, in a method in which a correction is made using RGB and the three attributes of a color such as hue, saturation, and lightness for a correction target area in a color image, there is a case where the original texture of an object deteriorates. This is because, when an area represented by an object included in an image is corrected according to the color correction method disclosed in Patent Literature 1, color correction for increasing the brightness, increasing the saturation, changing the hue, and the like of the whole object is made. When the color of a certain object in an image is corrected so as to make the image lighter, it causes such a phenomenon that a color component (for example, red) which originally has a high pixel value is saturated, and a correction parameter is added to or subtracted from the other color components (green and blue). If this process is carried out for the entire object area, the dispersion of the color information or the pixel values in the object area becomes narrower, and the apparent texture in the object area deteriorates.

In other words, in a general correction method as described in Patent Literature 1, while the image quality is improved by setting colors of the object included in a color image to more desirable colors, there is a problem in that the texture is deteriorated.

Moreover, Patent Literature 6 proposes the human skin reflection model applied to the rendering of facial images. However, the method disclosed in Patent Literature 6 requires a fiber-optic spectrometer which is a special measurement device in order to obtain 3-dimensional information of the facial image. Therefore, it is difficult to apply this method to color correction performed by such an ordinary color image processing device.

In order to solve the problems, as disclosed in Non Patent Literature 3, it is possible to use a technique of reconstructing a 3-dimensional facial image from a 2-dimensional facial image as a method of obtaining 3-dimensional information of a facial image. However, when color correction is performed by ordinary color image processing, it is preferable to suppress the computation costs further than the reconstruction technique disclosed in Non Patent Literature 3. In other words, it is preferable to perform color image processing without using the special measurement device described above or a technique requiring a high computation cost.

In addition, in the image processing method disclosed in Patent Literature 7, colors are changed by applying a Klinker's division method and a model relating to illumination and reflection such as a Phong illumination model or a Lambertian reflection model without reconstructing 3-dimensional information of an object included in an image. The image processing method disclosed in Patent Literature 7 is a technique that is effective in a case where an assumed reflection model such as plastic, paint, paper, or pottery frequently coincides with the actual object. However, in a case where an object having complex reflection characteristics such as a human skin is changed using the image processing method disclosed in Patent Literature 7, there is a problem in that an artifact and the like appear. Thus, it is difficult to determine that the image processing method disclosed in Patent Literature 7 is capable of reproducing an object in desired colors and improving the texture thereof. In Patent Literature 7, a method for correcting an object included in an input image for a desired image quality is not disclosed.

Therefore, an exemplary object of the present invention is to provide a color image processing method, a color image processing device, and a color image processing program capable of improving the texture of an object in a color image captured by a color image device at a low computation cost.

Solution to Problem

A color image processing method according to the present invention includes: detecting an object area which is an area to be subjected to image processing from an input image; calculating color information of the object area and a perfect diffusion component which is a low-frequency component of the object area; reconstructing a surface reflection component based on the color information and the low-frequency component; correcting the reconstructed surface reflection component according to a reference surface reflection component that is the surface reflection component set in advance according to the object area; calculating a reproduced color which is a color obtained by correcting each pixel included in the input image by using the perfect diffusion component and the corrected surface reflection component; and generating an output image based on the reproduced color.

A color image processing device according to the present invention includes: an object area detection means that detects an object area which is an area to be subjected to image processing from an input image; a reflection component reconstruction means that calculates color information of the object area and a perfect diffusion component which is a low-frequency component of the object area and reconstructs a surface reflection component based on the color information and the low-frequency component; a surface reflection component correction means that corrects the reconstructed surface reflection component according to a reference surface reflection component that is the surface reflection component set in advance according to the object area; and a reproduced color calculation means that calculates a reproduced color which is a color obtained by correcting each pixel in the input image by using the perfect diffusion component and the corrected surface reflection component and generates an output image based on the reproduced color.

A color image processing program according to the present invention causes a computer to execute: an object area detection process for detecting an object area which is an area to be subjected to image processing from an input image; a reflection component reconstruction process for calculating color information of the object area and a perfect diffusion component which is a low-frequency component of the object area and reconstructing a surface reflection component based on the color information and the low-frequency component; a surface reflection component correction process for correcting the reconstructed surface reflection component according to a reference surface reflection component that is the surface reflection component set in advance according to the object area; and a reproduced color calculation process for calculating a reproduced color which is a color obtained by correcting each pixel in the input image by using the perfect diffusion component and the corrected surface reflection component and generating an output image based on the reproduced color.

Advantageous Effects of Invention

According to the present invention, it is possible to improve the texture of an object in a color image captured by a color image device at a low computation cost.

DESCRIPTION OF EMBODIMENTS

Figure 1:
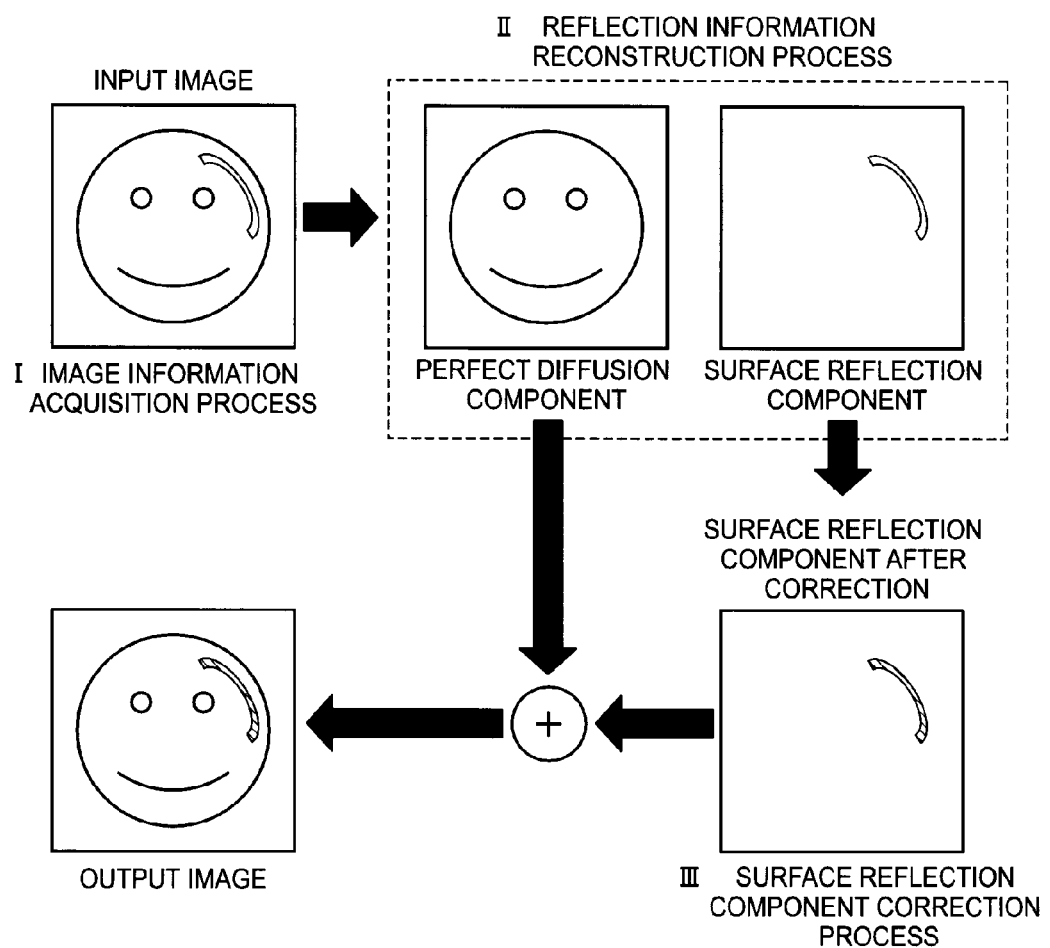
FIG. 1 It depicts an explanatory diagram illustrating an example of a color image processing according to the present invention.

Hereinafter, exemplary embodiments of the present invention will be described with reference to the drawings. In order to clarify the description, schematic drawings are appropriately used in the following description. Moreover, in the drawings, constituent components having the same configurations or the same functions and portions corresponding to the constituent components will be denoted by the same reference numerals, and description of configurations or functions which have been described once will not be provided in the subsequent description.

First, an overview of an aspect of a color image processing method performed by a color image processing device according to the present invention will be described. In the color image processing method according to the present invention, when the texture of a specific object in an input image is improved, first, the color image processing device calculates a low-frequency component of the specific object in the input image. Subsequently, the color image processing device uses the calculated low-frequency component as a perfect diffusion component including shading information of the specific object. Moreover, the color image processing device subtracts the perfect diffusion component (including the shading information) from the input image to thereby calculate a surface reflection component (highlight) on the specific object.

Subsequently, the color image processing device corrects the calculated amount of the surface reflection component of the specific object to a desired amount. Then, the color image processing device calculates a reproduced color of the specific object using the corrected surface reflection component and the perfect diffusion component including the shading information. Here, the reproduced color is a color that is obtained by correcting pixels of the input image and is calculated using the corrected surface reflection component and the perfect diffusion component. By doing so, it is possible to express the texture of the appearance after the correction of the specific object in colors closer to the natural colors and more desirable texture.

The meanings of the words described in the overview of processing described above will be described later.

FIG. 1 is an explanatory diagram illustrating an example of a color image processing according to the present invention. Hereinafter, an overview of a color image processing method performed by a color image processing device according to the present invention will be further described with reference to FIG. 1.

I. First, the color image processing device acquires information on an input image that is input (hereinafter referred to as an image information acquisition process). Specifically, when the input image is input, the color image processing device specifies a specific object from the input image. The specific object is an area specified as an object to be corrected. The color image processing device specifies the specific object to thereby detect an area (hereinafter sometimes referred to as an object area) in which a surface reflection component is corrected. Moreover, the color image processing device acquires color information (that is, color of the object area) of the specific object.

II. Subsequently, the color image processing device reconstructs reflection information of the specific object (hereinafter referred to as a reflection information reconstruction process). Here, the reflection information is information on reflection light reflected from the specific object. The reflection information of the specific object is generally reconstructed based on a 3-dimensional shape of the specific object and geometric conditions of an illumination. On the other hand, in the color image processing method according to the present invention, a low-frequency component of the specific object is used instead of the 3-dimensional shape.

First, the color image processing device uses a perfect diffusion component including shading information as the low-frequency component of the specific object. Moreover, the color image processing device reconstructs the surface reflection component by removing the low-frequency component from the color information of the specific object. In this case, the color image processing device calculates the surface reflection component by subtracting the low-frequency component from the color information with respect to the pixel values of the respective pixels of the input image. In this way, the color information of the specific object is divided into the surface reflection component and the perfect diffusion component (that is, the perfect diffusion component including the shading information). That is, the surface reflection component is reconstructed.

Here, the surface reflection component is a component of reflection light reflected from the surface of an object and is information that represents so-called shine. Moreover, the perfect diffusion component is a low-frequency component of the specific object, and the shading information is information that represents the luminance of the perfect diffusion component.

III. The color image processing device corrects the surface reflection component (hereinafter referred to as a surface reflection component correction process). Specifically, the color image processing device corrects the surface reflection component using a mean value of the surface reflection components and a reference surface reflection component. Here, the reference surface reflection component is a surface reflection component, which is set in advance according to a specific object (object area), determined as desired texture by a user or the others.

IV. The color image processing device calculates a reproduced color of a specific object using the perfect diffusion component that includes the shading information and surface reflection component that has been corrected (hereinafter sometimes referred to as a corrected surface reflection component) (hereinafter referred to as a reproduced color calculation process).

In the following description, it is assumed that an object area detected from a specific object is made up of a plurality of pixels. Moreover, it is assumed that each pixel has color information. Further, it is assumed that the color information is sometimes referred to as a pixel value. It is assumed that the color information includes at least a surface reflection component and a perfect diffusion component (including shading information). The color information may include information on colors other than the above. Moreover, in the following description, the specific object and the object area are not distinguished from each other. The configuration of the color image processing device that performs the above-described respective processes will be described below.

Figure 2:
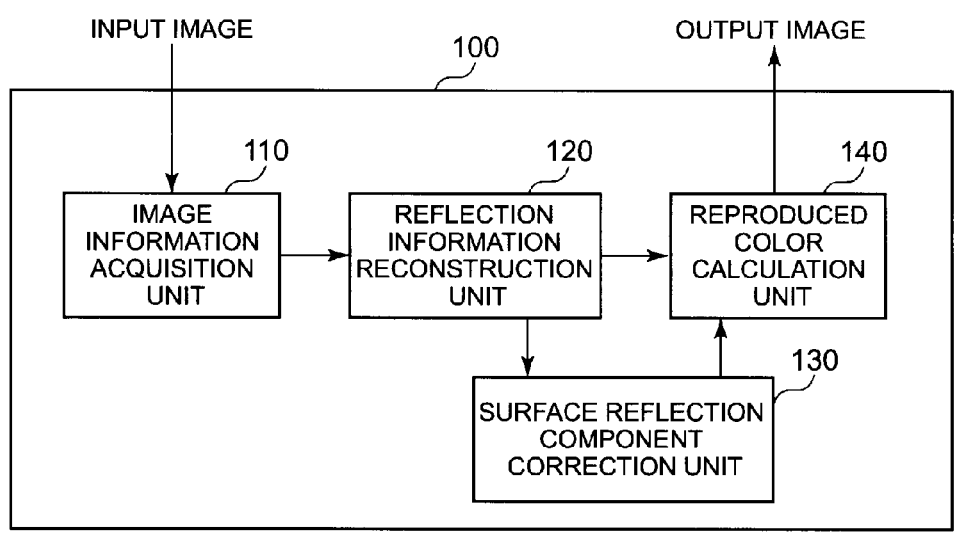
FIG. 2 It depicts a block diagram illustrating an exemplary embodiment of a color image processing device according to the present invention.

Next, the configuration of the color image processing device according to the present invention will be described. FIG. 2 is a block diagram illustrating an exemplary embodiment of the color image processing device according to the present invention. A color image processing device 100 illustrated in FIG. 2 includes an image information acquisition unit 110, a reflection information reconstruction unit 120, a surface reflection component correction unit 130, and a reproduced color calculation unit 140.

The image information acquisition unit 110 specifies a specific object based on an input image input from the outside and detects an object area of the specific object. Moreover, the image information acquisition unit 110 acquires the color information of the object area.

The reflection information reconstruction unit 120 calculates a low-frequency component of the object area. The calculated low-frequency component is the perfect diffusion component that includes the shading information of the object area. Moreover, the reflection information reconstruction unit 120 removes the perfect diffusion component from the color information of the object area to thereby reconstruct the surface reflection component of the object area. That is, the color information of the object area is divided into a surface reflection component (shine) and a perfect diffusion component, which are reconstructed as respective components.

The surface reflection component correction unit 130 corrects the surface reflection component that is reconstructed by the reflection information reconstruction unit 120. Here, the correcting of the surface reflection component means changing the area of pixels that have the surface reflection component or changing the intensity of the surface reflection component. The surface reflection component correction unit 130, for example, may correct the surface reflection component by changing the shape of the surface reflection component. In addition, the surface reflection component correction unit 130 may correct the surface reflection component by increasing or decreasing the intensity of the surface reflection component.

At the time of performing the correction, the surface reflection component correction unit 130 calculates a mean value of the surface reflection component of the object area and corrects the surface reflection component using the calculated mean value. The surface reflection component correction unit 130, for example, may correct the surface reflection component by comparing an optional value set in advance with the mean value of the surface reflection components of the object area. The surface reflection component correction unit 130, for example, may use the reference surface reflection component as the optional value. The reference surface reflection component, for example, is stored in advance in a memory (hereinafter, referred to as a reference surface reflection component storing memory) that is included in the color image processing device 100. In addition, the surface reflection component correction unit 130 may receive a correction value from a user and correct the surface reflection component using the received correction value. Here, the correction value is a general term of information that is used when the surface reflection component correction unit 130 corrects the surface reflection component.

In the description presented below, the area of pixels having surface reflection components and the intensity of the surface reflection component are collectively referred to as an amount of the surface reflection component. Accordingly, the correcting of the amount of the surface reflection component represents correcting the area of pixels of the surface reflection component or correcting a pixel value that represents the intensity of the surface reflection component.

The reproduced color calculation unit 140 calculates a reproduced color using the perfect diffusion component that includes the shading information and the corrected surface reflection component. Then, the reproduced color calculation unit 140 generates an output image using the calculated reproduced color.

When the description presented above is summarized, first, the image information acquisition unit 110 acquires a low-frequency component of the object area. Next, the reflection information reconstruction unit 120 reconstructs the surface reflection component and the perfect diffusion component of the area using the obtained low-frequency component of the object area. Then, the surface reflection component correction unit 130 corrects the reconstructed surface reflection component. By performing the above-described processes, the color image processing device 100 can correct the reconstructed surface reflection component using the low-frequency component of the object area.

In addition, the reflection information reconstruction unit 120 reconstructs the surface reflection component and the perfect diffusion component, which includes the shading information, of the object area from the color information obtained from the image, and the surface reflection component correction unit 130 performs a correction only for the surface reflection component. By performing such a process, the occurrence of unnatural artifacts is suppressed. In addition, by not reconstructing the 3-dimensional information, the processing cost can be suppressed to be low.

Hereinafter, the operation of the color image processing device according to the present invention will be described with reference to respective exemplary embodiments.

First Exemplary Embodiment

Figure 3:
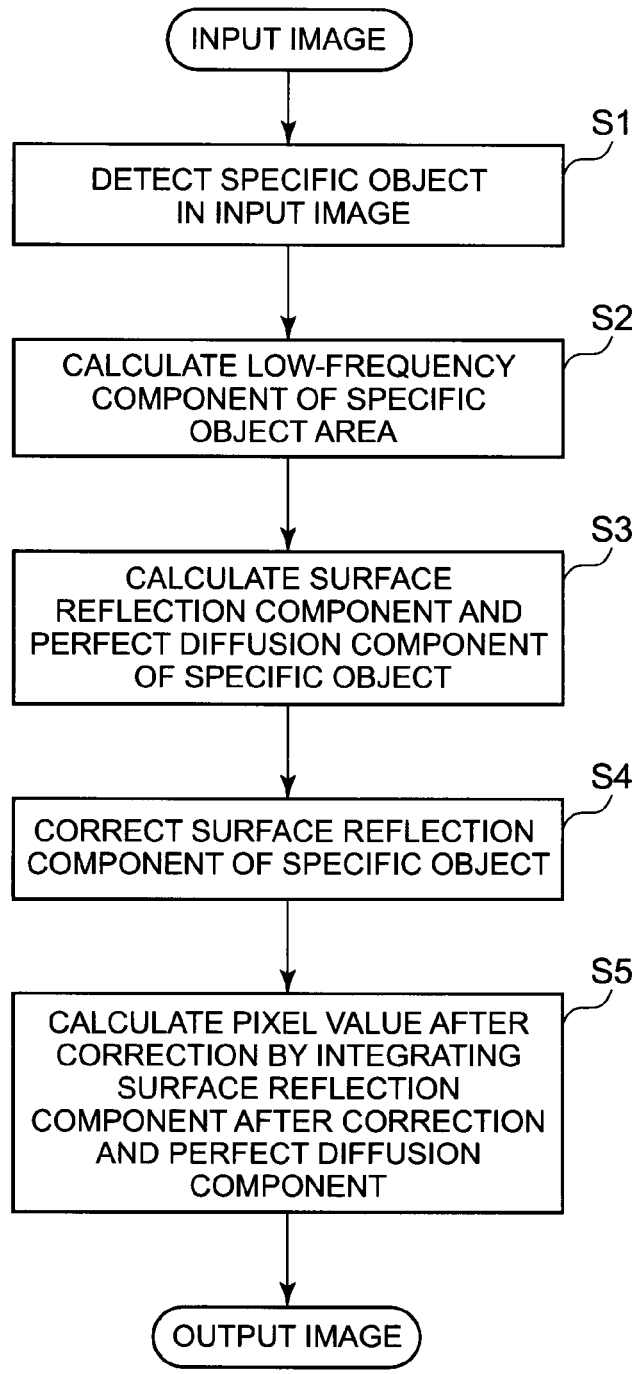
FIG. 3 It depicts a flowchart illustrating an example of a color image processing method according to a first exemplary embodiment of the present invention.

First, the flow of the processes of a color image processing method according to a first exemplary embodiment of the present invention will be described with reference to the drawings. FIG. 3 is a flowchart illustrating an example of the color image processing method according to the first exemplary embodiment of the present invention. In the following description, it is assumed that the color image processing method according to the exemplary embodiment is realized using the color image processing device 100 illustrated in FIG. 2. Moreover, in the following description, it is assumed that the color system of an image is an RGB color system. That is, it is assumed that the color of an image is represented by a combination of R (red), G (green), and B (blue). Hereinafter, it is assumed that the color information of an input image is represented as color information RGB. However, the color system of an image is not limited to the RGB color system. The color system of an image may be other color systems than the RGB color system.

Hereinafter, the operation of the color image processing device 100 illustrated in FIG. 2 to recalculate a reproduced color of each pixel of an object area in a color image in order to improve the texture of the specific object in an optional color image will be described.

First, the image information acquisition unit 110 automatically detects a specific object from an input image (step S1). In this case, the image information acquisition unit 110 acquires the color information of the object area in the detected specific object. Here, the automatic detection of the specific object from the input image means detecting a predetermined object (for example, the face of a human) from an input image as a specific object and detecting an object individually designated by a user as a specific object.

Here, the individual objects detected as the specific object may be different from each other. That is, even when there is an individual difference, since rough color information and texture are universal, the specific object is not limited to a particular individual object as long as it can be specified as a supposed object from the features obtained from the color image.

Figure 4:
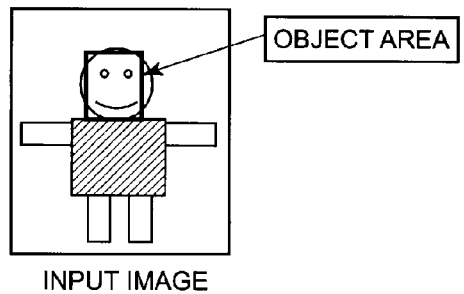
FIG. 4 It depicts an explanatory diagram illustrating an example of a process of detecting an object area in an input image.

FIG. 4 is an explanatory diagram illustrating an example of a process of detecting an object area in an input image. In the example of FIG. 4, the object area is the face of a human. The image information acquisition unit 110 detects a specific object using the color information, the texture, and the like from the color image illustrated in FIG. 4. Hereinafter, a case where the specific object is the face of a human will be described.

When the specific object is the face of a human, the image information acquisition unit 110 detects a face area using the shape features of eyes, a nose, and a mouth. The image information acquisition unit 110 may use the face detection method disclosed in Non Patent Literature 2, for example, as a method of detecting a face area. As described above, the face detection method disclosed in Non Patent Literature 2 is a method using generalized learning vector quantization in which an image-based face detection method and a feature-based face detection method of detecting eyes are combined.

In addition to the above, the image information acquisition unit 110 may use a method of detecting eyes from an image, disclosed in Patent Literature 2, for example, as a method of detecting a face area from an input image. It is easy to estimate a face area as long as the position of eyes can be detected from an input image.

In the face detection method disclosed in Non Patent Literature 2 and the eye detection method disclosed in Patent Literature 2, the face is detected using monochrome information. The image information acquisition unit 110 also determines whether the face area which is the detection result has a flesh color. By adding such a determination process, it is possible to improve the detection accuracy of the face area. As a method of determining whether a designated area has a flesh color, an image histogram disclosed in Patent Literature 1, for example, may be used.

The method of the image information acquisition unit 110 to detect a face area from an input image is not limited to the above method. Moreover, in the above description, a case where the object that is automatically detected from an optional input image is the face of a human has been described. However, the object detected automatically is not limited to the face of a human. When an object other than the human face is automatically detected, the image information acquisition unit 110 may automatically detect an object by comparing visual feature information of an object area, registered in advance with visual characteristic information of the image data, for example.

Next, the reflection information reconstruction unit 120 calculates a surface reflection component and a perfect diffusion component. In the present invention, it is focused on that the surface reflection component (shine) of a specific object in an image has an aspect of having a high frequency component. Specifically, the reflection information reconstruction unit 120 calculates a surface reflection component (shine) and a perfect diffusion component (including shading information) from color information of the appearance of a specific object without using a 3-dimensional shape of the specific object. Accordingly, the surface reflection component can be calculated at a low computation cost. Hereinafter, the process performed by the reflection information reconstruction unit 120 will be described in detail in steps S2 and S3.

First, the reflection information reconstruction unit 120 calculates a low-frequency component of an area indicated by the specific object in the image (step S2). The reflection information reconstruction unit 120 may calculate the low-frequency component by calculating the mean value of the surrounding pixels of each pixel in the area indicated by the specific object in the image, for example. Moreover, the reflection information reconstruction unit 120 may calculate the low-frequency component using a smoothing filter that substitutes respective pixels into Gaussian values or the like. However, a method of calculating the low-frequency component is not limited to the above method.

Subsequently, the reflection information reconstruction unit 120 uses the low-frequency component calculated in step S2 as the perfect diffusion component of the specific object in the input image. Moreover, the reflection information reconstruction unit 120 subtracts the perfect diffusion component from the color information of the specific object in the input image to thereby calculate the surface reflection component (step S3).

In general, the reflection of an object area depends on the geometrical conditions of incident light and emitted light, and this reflection characteristic is expressed as a BRDF (Bidirectional Reflectance Distribution Function). The BRDF is often composed of two components of a surface reflection component (Secular component) and a perfect diffusion component (Body reflection component). For example, when the specific object is a living creature such as a human, the surface reflection component is a component of light that is reflected on the skin surface. Moreover, in this case, the perfect diffusion component is a component of light that is generated when light temporarily enters inside the skin, and is scattered inside the skin and dispersed again through the skin.

The perfect diffusion component has low-frequency characteristics. Thus, the low-frequency component of an area indicated by the specific object can be regarded as the perfect diffusion component DR (Diffuse Reflection) of the specific object. In this example, it is assumed that the perfect diffusion component DR is calculated for each color channel (for example, R, G, B, or the like), and the perfect diffusion component of each color channel is expressed as DRi. Here, the character i represents each color channel.

Now, the perfect diffusion component is calculated, assuming that the specific object is Lambertian. However, the perfect diffusion component actually includes not only the diffuse reflection component but also a surface reflection component. That is, the pixel value of each color channel of the input image can be said to represent the apparent pixel value (luminance or brightness) of the color channel, including the diffuse reflection component and the surface reflection component. Thus, the reflection information reconstruction unit 120 calculates the surface reflection component SPi of each color channel of pixels included in an area indicated by the specific object by Equation (1) below.

For $Ii-DRi>0$, $SPi=Ii-DRi$ Otherwise, $SPi=0$     Equation (1)

Here, "Ii" represents the pixel value of a pixel included in an area indicated by the specific object of the input image, and "i" represents a color channel (for example, R, G, B, or the like).

Next, the surface reflection component correction unit 130 corrects the surface reflection component of the specific object (step S4). Specifically, when the surface reflection component of the specific object area included in the color image is obtained, the surface reflection component correction unit 130 improves the texture of the specific object by controlling the amount (the area or the intensity) of the surface reflection component. Here, the controlling of the "area" means increasing or decreasing the number (area) of pixels including the surface reflection component. In addition, the controlling of the "intensity" represents increasing or decreasing the value of each pixel of the surface reflection component. In other words, the surface reflection component correction unit 130 controls or adjusts the amount of the surface reflection component such as the area or the magnitude of the intensity of the surface reflection component of the specific object that is included in the input color image, thereby generating a desired surface reflection component.

First, the method of correcting the intensity of the surface reflection component as the amount of the surface reflection component, using the surface reflection component correction unit 130 will be described. In the description presented below, a desired amount of the surface reflection component (that is, the reference surface reflection component) of the object area is assumed to be stored in a memory (not illustrated) of the color image processing device 100 in advance. A mean of the amounts of the surface reflection components is represented as below.

$\overline{SPrefi}$     [Formula 1]

This mean can be calculated as below. First, an image (hereinafter, referred to as a reference image) in which the texture of a specific object is regarded to be satisfactory by a user or anyone else is prepared in advance. Then, by performing the process represented in steps S1 to S3 described above for the reference image, a surface reflection component of the specific object is calculated. This reference image may be regarded as an image in which a surface reflection component of which the texture is determined to be satisfactory by a user or anyone else is set in advance according to the object area. Here, a surface reflection component of each pixel, which is calculated based on the reference image, is referred to as SPRi. Since SPRi represents the pixel value of each pixel, the surface reflection component correction unit 130 can calculate a mean of the amounts of the surface reflection components by acquiring a mean of SPRi.

Next, the surface reflection component correction unit 130 calculates a mean value of the surface reflection components in the object area that is included in the input image. The mean value of the surface reflection components in the object area that is included in the input image is represented as below.

$\overline{SPi}$     [Formula 2]

Then, the surface reflection component correction unit 130 calculates a correction coefficient $\alpha i$ by using the following Equation (2) based on the mean value.

[Formula 3]

$\alpha i = \overline{SPrefi}/\overline{SPi}$     Equation (2)

After the correction coefficient is calculated, the surface reflection component correction unit 130 multiplies the surface reflection component SPi in the object area included in the input image by the correction coefficient $\alpha i$ calculated by using Equation (2), thereby correcting the surface reflection component to have a desired amount (intensity) of the surface reflection component. The surface reflection component correction unit 130, for example, may correct the amount of the surface reflection component using the following Equation (3).

$SPi' = \alpha i \times SPi$     Equation (3)

As above, the surface reflection component correction unit 130 corrects the pixel value of the surface reflection component according to a ratio between the mean value of the surface reflection components in the object area of the input image and the mean value of the surface reflection components (that is, the reference surface reflection component) set in advance according to the object area. In this way, by correcting the intensity of the surface reflection component included in the object area, the texture can be improved.

Next, the method of correcting the area of the surface reflection component as the amount of the surface reflection component, using the surface reflection component correction unit 130 will be described. Further, in the case of correcting the area of the surface reflection component, similarly to the case of correcting the intensity, the surface reflection component included in the object area of a reference image that is set in advance is used. However, in the case of correcting the area, the amount (area) of the surface reflection component included in the specific object of the input image is adjusted using a desired amount (area) of the surface reflection component. The area may be represented as a ratio of the number of pixels of the surface reflection component to the number of pixels of the object area.

First, the method of correcting the surface reflection component by decreasing the area of the surface reflection component will be described. In this case, the surface reflection component correction unit 130 corrects the surface reflection component such that the number of pixels (that is, the area) of the surface reflection component included in the specific object area of the input image approaches a desired amount (area) of the surface reflection component of the object area. Specifically, the surface reflection component correction unit 130 performs a correction for decreasing the amount (intensity) of the surface reflection component by using a coefficient $\beta i$ (($\beta i < \alpha i$), instead of $\alpha i$ described above, for decreasing the amount (intensity) of the surface reflection component in Equation (3). Then, the surface reflection component correction unit 130 sets a pixel value SPi' of a pixel having a corrected pixel value SPi' that is below a threshold value set in advance to 0 (zero). By setting the surface reflection component to 0 as above, the amount (area) of the surface reflection component is decreased.

As above, the surface reflection component correction unit 130 performs a correction for decreasing the area of the surface reflection component included in the object area of the input image so as to be the area of the surface reflection component (that is, the reference surface reflection component) that is set in advance according to the object area. At that time, the surface reflection component correction unit 130 decreases the pixel value of the surface reflection component included in the object area based on a predetermined rule by multiplying the pixel value by a coefficient for decreasing the pixel value of the surface reflection component or the like. Then, the surface reflection component correction unit 130 excludes pixels each having a pixel value that is below a threshold value set in advance out of pixel values from the surface reflection component. In this way, by performing a correction for decreasing the area of the surface reflection component included in the object area, the texture can be improved.

Next, the method of correcting the surface reflection component by increasing the area of the surface reflection component will be described. In this case, as illustrated in Equation (1), a pixel that is not an original surface reflection component does not become the surface reflection component without any change. Accordingly, in order to increase the area of the surface reflection component, it is necessary to perform a separate dividing process.

In this case, the surface reflection component correction unit 130, for example, randomly selects a pixel that is originally not the surface reflection component (in other words, a pixel that is not reconstructed as the surface reflection component by the reflection information reconstruction unit 120) and is adjacent to a pixel (that is, a pixel that is reconstructed as the surface reflection component by the reflection information reconstruction unit 120) that is originally the surface reflection component. Then, the surface reflection component correction unit 130 substitutes the pixel value of the selected pixel, for example, in SPi represented in Equation (3), thereby calculating a pixel value SPi' after the correction. In addition, in a case where the pixel value of the selected pixel is 0 (zero), the surface reflection component correction unit 130 adds a positive real number to the pixel value (that is, the surface reflection component) SPi of the selected pixel. Here, in the case of using Equation (3), the surface reflection component correction unit 130 may calculate a pixel value SPi' after the correction by using a coefficient for increasing the pixel value so as to increase the area instead of the coefficient $\alpha i$. Thereafter, the surface reflection component correction unit 130 randomly selects pixels that are adjacent to pixels that are originally the surface reflection components until a desired area is acquired obtained and repeats the operation of correcting the pixel values of the pixels. In this way, by increasing the number of pixels that are the surface reflection components, the amount (area) of the surface reflection component is increased.

As above, the surface reflection component correction unit 130 corrects the area of the surface reflection component included in the object area of the input image so as to increase up to the area of the surface reflection component (that is, the reference surface reflection component) that is set in advance according to the object area. At that time, the surface reflection component correction unit 130 selects pixels that are adjacent to the surface reflection component out of pixels that are not the surface reflection components, for example, based on a predetermined rule such as a rule for a random selection. Then, the surface reflection component correction unit 130 adds the selected pixels to the surface reflection component. As above, by performing a correction for increasing the area of the surface reflection component included in the object area, the texture can be improved.

Next, the reproduced color calculation unit 140 calculates the color of each pixel after the correction that is included in the object included in the input image using the surface reflection component after the correction and the perfect diffusion component (including the shading information) (step S5). The color after the correction may be regarded as a reproduced color.

The reproduced color calculation unit 140, as represented in the following Equation (4) as an example, calculates a pixel value Ii' after the color correction by adding the surface reflection component Spi' corrected in step S4 to the perfect diffusion component DRi that includes the shading information.

$$Ii' = DRi + Spi' \qquad \text{Equation (4)}$$

Then, the reproduced color calculation unit 140 outputs an image in which the colors of the object area included in the input image are corrected using the above-described method as an output image.

In the above description, a case where the device-dependent colors of the input and output images are RGB has been described. The "device-dependent colors" mean a color space that depends on an output destination device. However, the device-dependent colors are not limited to RGB. The device-dependent colors may be CMY and CMYK other than RGB as long as the corresponding relation between those device-dependent colors and the tristimulus values XYZ of device-independent colors can be obtained. In this case, the color correction method of the present invention can be applied to images of colors other than RGB.

As described above, according to the present exemplary embodiment, the image information acquisition unit 110 detects an object area from an input image. Subsequently, the reflection information reconstruction unit 120 calculates the color information and the perfect diffusion component of the object area and reconstructs the surface reflection component based on the color information and the low-frequency component. Then, when the surface reflection component correction unit 130 corrects the surface reflection component that is reconstructed according to the reference surface reflection component, the reproduced color calculation unit 140 calculates a reproduced color by using the perfect diffusion component and the corrected surface reflection component and generates an output image based on the reproduced color. Accordingly, it is possible to improve the texture of an object in a color image at a low computation cost.

Figure 5:
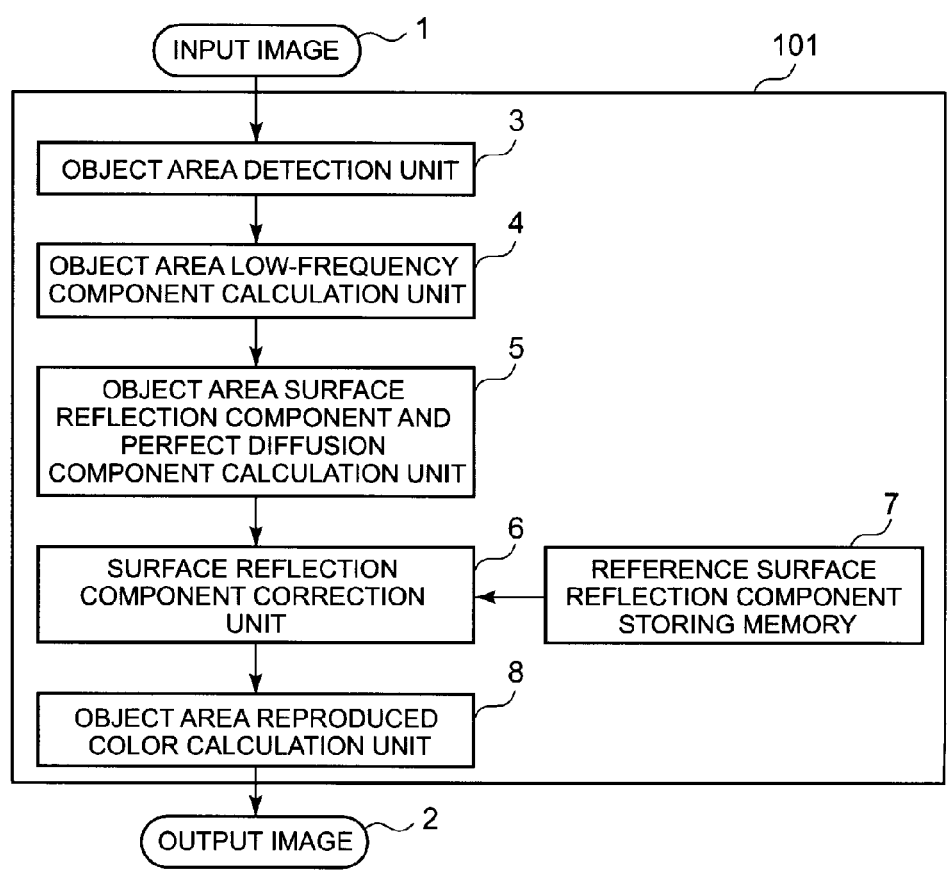
FIG. 5 It depicts a block diagram illustrating an example of a color image processing device applied to the color image processing method according to the first exemplary embodiment.

Next, a modification example of the color image processing device (also referred to as a color correction device) will be described. FIG. 5 is a block diagram illustrating an example of a color image processing device that is applied to the color image processing method according to the first exemplary embodiment.

A color image processing device 101 illustrated in FIG. 5 as an example is a device that corrects a surface reflection component included in an object area in an input image 1 and outputs an output image 2. The color image processing device 101 includes an object area detection unit 3, an object area low-frequency component calculation unit 4 (hereinafter, referred to as a low-frequency component calculation unit 4), an object area surface reflection component and perfect diffusion component calculation unit 5 (hereinafter, referred to as a reflection information reconstruction unit 5), a surface reflection component correction unit 6, a reference surface reflection component storing memory 7, and an object area reproduced color calculation unit 8 (hereinafter a reproduced color calculation unit 8).

When an input image 1 is supplied, the object area detection unit 3 analyzes the input image 1 to detect a specific object that is assumed in advance. Moreover, the object area detection unit 3 outputs information that represents an object area in the detected specific object. Here, the information that represents the object area includes the color information of the object area. Specifically, the object area detection unit 3 obtains the color information of the object area using the method that the image information acquisition unit 110 performs as described in step S1 of FIG. 3.

Moreover, as described above, the specific object detected from the input image 1 is such an object that the color and the shape features of the object area can be limited to some extent like a human face. Further, the method of detecting the specific object is as described in the description of the image information acquisition unit 110. Further, when it is not possible to detect an object from the input image 1, the reproduced color calculation unit 12 described later outputs the input image 1 as an output image 2.

The low-frequency component calculation unit 4 calculates a low-frequency component of the object area that is detected by the object area detection unit 3. Specifically, the low-frequency component calculation unit 6 calculates the low-frequency component of the object area based on the process that the reflection information reconstruction unit 120 performs as described in step S2.

The reflection information reconstruction unit 5 obtains a surface reflection component and a perfect diffusion component of the object area by using the low-frequency component of the object area. Specifically, the reflection information reconstruction unit 5 obtains the surface reflection component and the perfect diffusion component of the object area according to the process that the reflection information reconstruction unit 120 performs as described in step S3.

The reference surface reflection component storing memory 7 stores the reference surface reflection component of the object area. In addition, as described above, the reference surface reflection component is a surface reflection component that brings a desired image quality of the object area and is set in the reference surface reflection component storing memory 7 in advance according to the object area.

The surface reflection component correction unit 6 corrects the amount of the surface reflection component included in the object area, which has been calculated, to a desired amount by using the reference surface reflection component. Specifically, the surface reflection component correction unit 6 corrects the surface reflection component included in the object area according to the process that is performed by the surface reflection component correction unit 130 described in step S4 illustrated in FIG. 3. By performing the above-described correction using the surface reflection component correction unit 6, the colors of an object having complex reflection characteristics such as a human skin can be reproduced with high accuracy. In addition, by performing the above-described correction, the appearance of artifacts can be avoided.

The reproduced color calculation unit 8 calculates a reproduced color of the object area. Specifically, the reproduced color calculation unit 8 calculates a color (in other words, a reproduced color) of each pixel after the correction that is included in the object area by using the corrected surface reflection component and the perfect diffusion component including the shading information. Moreover, the reproduced color calculation unit 12 outputs the calculated corrected image as an output image. Further, the corrected surface reflection component is a component that is corrected by the surface reflection component correction unit 6 and represents a desired surface reflection component of each pixel included in the object area. In addition, the perfect diffusion component is a component that is calculated by the reflection information reconstruction unit 5. The reproduced color calculation unit 12 outputs an image after the correction according to the flow of the process that the reproduced color calculation unit 140 performs as described in step S5.

As above, the color image processing device 101 provides a method of improving the image quality by adjusting the surface reflection component, that is, shine as a method of realizing a desired image quality of a human face. The shine may be regarded as an unpleasant specular reflection component. For example, in Patent Literature 7 described above, as a relating technique, a method of changing the color of an artificial material such as plastic that has a dichromatism reflection model from red to blue is described. However, the object of the method disclosed in Patent Literature 7 is not for correcting an image to have a desired image quality by improving the image quality but for changing the color of an artificial material to a different color (color changing). Meanwhile, according to the present invention, the surface reflection component correction unit 6 corrects the surface reflection component, and the reproduced color calculation unit 8 generates an output image using the corrected surface reflection component. In other words, since the color image processing device 101 includes the surface reflection component correction unit 6 and the reproduced color calculation unit 8, it can correct an object to have a desired image quality.

From the above, the color image processing device 101 illustrated in FIG. 5 and the color image processing device 100 illustrated in FIG. 2 have the following correspondence.

The image information acquisition unit 110 corresponds to the object area detection unit 3. The reflection information reconstruction unit 120 is realized by the low-frequency component calculation unit 4 and the reflection information reconstruction unit 5. The surface reflection component correction unit 130 is realized by the surface reflection component correction unit 6 and the reference surface reflection component storing memory 7. The reproduced color calculation unit 140 corresponds to the reproduced color calculation unit 8. The configuration of the color image processing device illustrated in FIG. 2 or FIG. 5 is merely an example, and other device configurations may be used as long as the device can realize the same functions.

Further, the color image processing device 101 can be realized by a computer. Specifically, the respective constituent components that constitute the color image processing device, that is, the object area detection unit 3, the low-frequency component calculation unit 4, the reflection information reconstruction unit 5, the surface reflection component correction unit 6, and the reproduced color calculation unit 8 are realized by a central processing unit (CPU) of a computer that operates according to a program (color image processing program). Moreover, the representative surface reflection component storing memory 7, for example, is realized by a memory device included in the color image processing device 101, for example.

For example, the program may be stored in a storage unit (not illustrated) of the color image processing device 101, and the CPU may read the program and operate as the object area detection unit 3, the low-frequency component calculation unit 4, the reflection information reconstruction unit 5, the surface reflection component correction unit 6, and the reproduced color calculation unit 8 according to the program. In addition, the object area detection unit 3, the low-frequency component calculation unit 4, the reflection information reconstruction unit 5, the surface reflection component correction unit 6, and the reproduced color calculation unit 8 may be realized by dedicated hardware, respectively.

Further, the statement that the respective constituent components constituting the color image processing device can be realized by a CPU and a memory and can operate according to a program is also applicable to a second exemplary embodiment described later without being limited to the first exemplary embodiment.

Second Exemplary Embodiment

Subsequently, the flow of the processes of a color image processing method according to a second exemplary embodiment of the present invention will be described. The color image processing method according to the second exemplary embodiment is different from the color image processing method according to the first exemplary embodiment in that a surface reflection component is changed according to a user's instruction.

Figure 6:
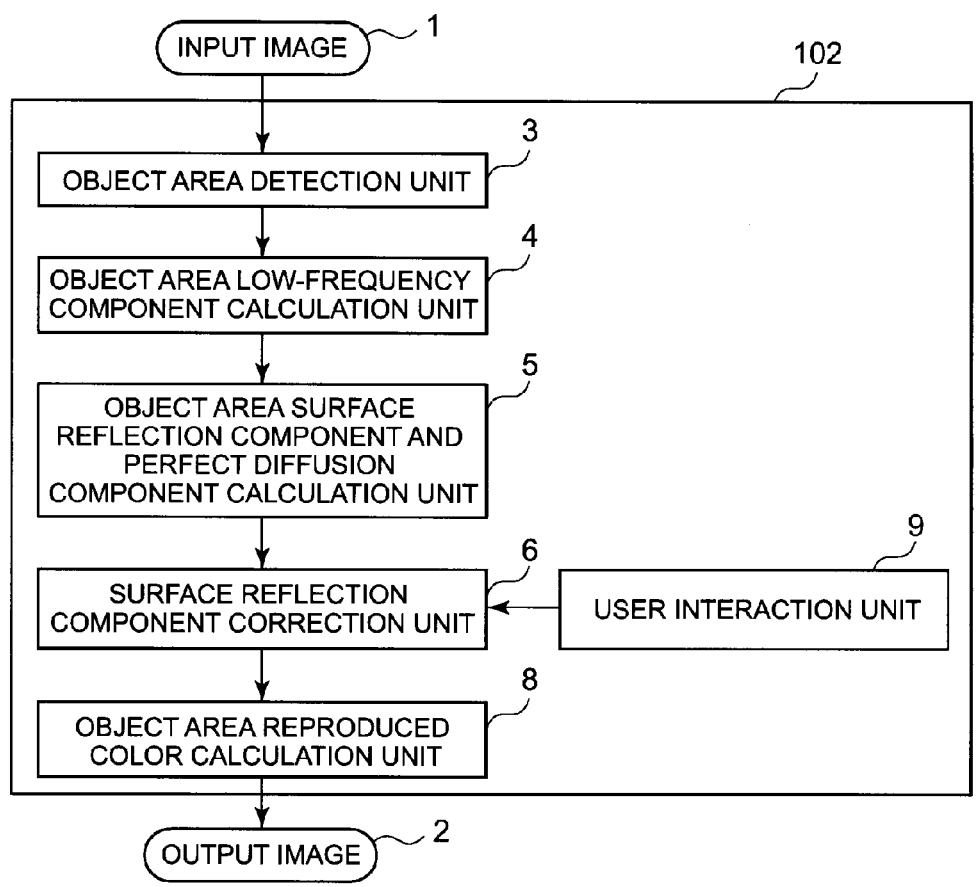
FIG. 6 It depicts a block diagram illustrating an example of a color image processing device applied to the color image processing method according to the first exemplary embodiment.

FIG. 6 is a block diagram illustrating an example of a color image processing device that is applied to the color image processing method according to the second exemplary embodiment. The color image processing device 102 illustrated in FIG. 6 is a device that corrects a surface reflection component included in an object area of an input image 1 and outputs an output image 2. The color image processing device 102 includes an object area detection unit 3, a low-frequency component calculation unit 4, a reflection information reconstruction unit 5, a surface reflection component correction unit 6, a user interaction unit 9, and a reproduced color calculation unit 8.

As illustrated in FIG. 6, in the color image processing device 102, the reference surface reflection component storing memory 7 of the color image processing device 101 illustrated in FIG. 5 is replaced by the user interaction unit 9. Thus, hereinafter, only the user interaction unit 9 will be described.

The user interaction unit 9 provides an interaction means for a user to adjust the amount of a surface reflection component included in a specific object area included in an input image. Specifically, the user interaction unit 9 is an input means for inputting the amount of the surface reflection component included in the specific object area included in the input image. The user interaction unit 9, for example, is realized by a display device such as a touch panel or a display and a pointing device such as a mouse.

Figure 7:
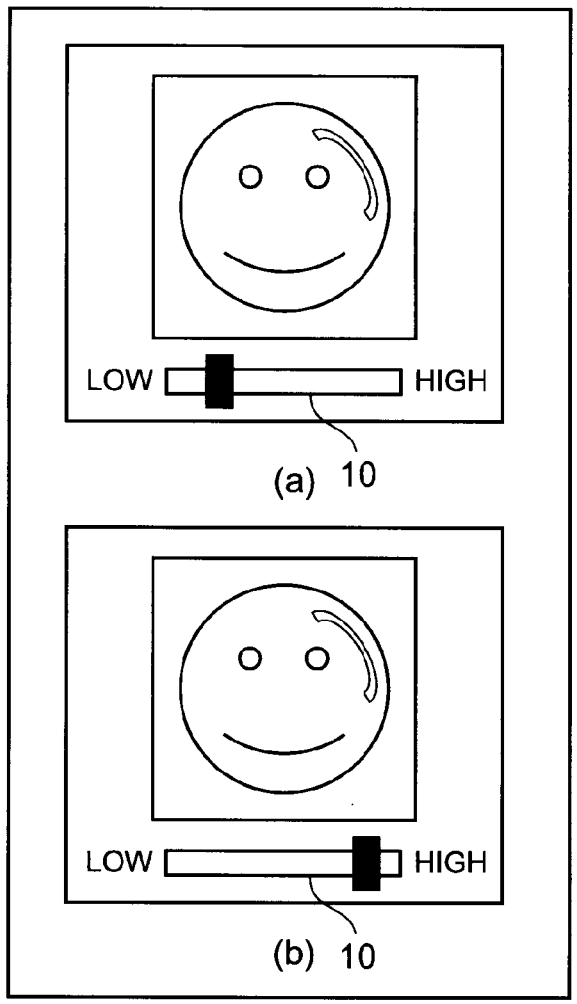
FIG. 7 It depicts an explanatory diagram illustrating an example of a GUI that is displayed by a user interaction unit 9.

FIG. 7 is an explanatory diagram illustrating an example of a graphic user interface (GUI) that is displayed by the user interaction unit 9. The GUI illustrated in FIG. 7 is used for adjusting the amount of the surface reflection component included in the specific object area that is included in the input image, which is calculated, in an interactive manner. A slider bar 10 illustrated in FIG. 7, for example, has a function of adjusting the value of the correction coefficient $\alpha i$ represented in Equation (3) described above. For example, in a case where the slider bar 10 is adjusted so as to weaken the surface reflection component, the user interaction unit 9 may adjust the value of the correction coefficient $\alpha i$ so as to decrease (see FIG. 7(a)). To the contrary, in a case where the slider bar 10 is adjusted so as to highlight the surface reflection component, the user interaction unit 9 may adjust the correction coefficient $\alpha i$ so as to increase (see FIG. 7(b)). In addition, when the amount of the surface reflection component is adjusted, the user interaction unit 9 displays a corrected image on which an adjustment result of the surface reflection component included in the input image is reflected in real time.

The user interaction unit 9 receives an amount (correction value) of the surface reflection component that is input from a user and notifies the surface reflection component correction unit 6 thereof. The correction value may be a value used for designating a total amount of the surface reflection component or may be a value that represents an amount to be changed from the current surface reflection component. At this time, the surface reflection component correction unit 6 corrects the surface reflection component of each pixel by using the notified amount of the surface reflection component. In this way, an output image that is desired by the user can be generated.

For example, it is assumed that the user interaction unit 9 receives an instruction for increasing or decreasing the area of the surface reflection component as a correction value. In this case, the surface reflection component correction unit 6 may correct the surface reflection component by using the method of decreasing the area of the surface reflection component or the method of decreasing the area of the surface reflection component that has been described in the first exemplary embodiment. In addition, in a case where the user interaction unit 9 receives an instruction for increasing or decreasing the intensity of the surface reflection component as a correction value, the surface reflection component correction unit 6 may correct the surface reflection component using the method of correcting the intensity of the surface reflection component that has been described in the first exemplary embodiment.

In the description presented above, a configuration example has been described in which the reference surface reflection component storing memory 7 of the color image processing device 101 illustrated in FIG. 5 is replaced by the user interaction unit 9. However, the color image processing device 102 is not limited to a case where one constituent element of the reference surface reflection component storing memory 7 and the user interaction unit 9 is included. Thus, the color image processing device 102 may include both constituent elements of the reference surface reflection component storing memory 7 and the user interaction unit 9.

For example, in this case, first, the surface reflection component correction unit 6 corrects the surface reflection component using the reference surface reflection component that is stored in the reference surface reflection component storing memory 7. Then, the user interaction unit 9 displays an image that includes the corrected surface reflection component to a user. In a case where the user desires to further change the surface reflection component for the corrected image, the user can input a correction value through the user interaction unit 9. In this way, the surface reflection component correction unit 6 and the reproduced color calculation unit reproduced color calculation unit 8 can generate an output image that is desired by the user. In addition, also on the user side, the surface reflection component can be changed according to the purpose of the use.

Next, various exemplary embodiments for realizing the present invention will be described. The color image processing method and device according to the present invention may be realized using a computer. Moreover, the respective processes performed by the color image processing method and the color image processing device according to the present invention may be realized by a combination of at least two of software, hardware, and firmware.

For example, when the color image processing device 100 illustrated in FIG. 2 is realized by a computer using a program, the program (a group of program commands) causes a computer to execute at least the following procedures. Specifically, the program is loaded into a memory of the computer, and the following commands (a) to (d) are executed under the control of the CPU.

(a) An object area detection procedure for detecting an object area which is an area to be subjected to image processing from an input image. This procedure corresponds to the process performed by the image information acquisition unit 110 in FIG. 2.

(b) A reflection component reconstruction procedure for calculating color information of the object area and a perfect diffusion component which is a low-frequency component of the object area and reconstructing a surface reflection component based on the color information and the low-frequency component. This procedure corresponds to the process performed by the reflection information reconstruction unit 120 in FIG. 2.

(c) A surface reflection component correction procedure in which reconstructed surface reflection component is corrected in accordance with reference surface reflection component that is surface reflection component set in advance in accordance with object area. This procedure corresponds to the procedure that is performed by the surface reflection component correction unit 130 in FIG. 2.

(d) A reproduced color calculation procedure in which a reproduced color that is a color obtained by correcting each pixel included in input image is calculated using perfect diffusion component and corrected surface reflection component, and output image is generated based on the reproduced color. This procedure corresponds to the procedure that is performed by the reproduced color calculation unit 140 in FIG. 2.

In addition, the command executed by the program may include a user interaction procedure in which a correction value that is information used when the surface reflection component is corrected is input from a user. At this time, in the surface reflection component correction procedure, the surface reflection component may be corrected by using the input correction value.

Moreover, the program (the color image processing program) may be provided by recording the program in a recording medium, and also may be provided by transmitting the program via the Internet or the other communication media. Moreover, examples of the storage medium include a flexible disk, a hard disk, a magnetic disk, an opto-magnetic disc, a CD-ROM, a DVD, a ROM cartridge, a RAM memory cartridge with a battery backup, a flash memory cartridge, and a nonvolatile RAM cartridge. Further, examples of the communication media include a wired communication medium such as a telephone line, a radio communication medium such as a microwave line.

As described above, according to the present invention, the amount of the surface reflection component included in a specific object that is included in a color image captured by a color image device is controlled, whereby the texture can be improved.

According to the present invention, a problem in that deterioration of the texture of an object that occurs in a case where a general color correction method is used is solved. Specifically, by controlling the surface reflection component of a specific object included in a color image that is captured by a color image device, the object area can be changed so as to have desired texture. Further, according to the present invention, it is possible to improve the texture of the image using an easier method that uses only an input image without requiring a measurement device such as a fiber-optic spectrometer or the like.

Figure 8:
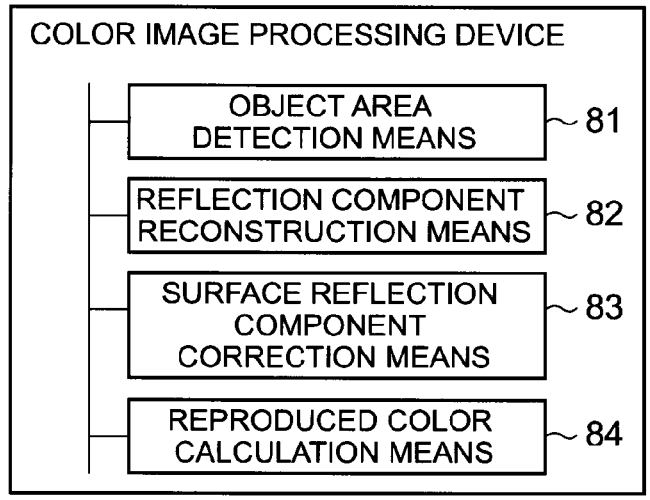
FIG. 8 It depicts a block diagram illustrating an example of minimal configurations of the color image processing device according to the present invention.

Next, an example of minimal configurations of the color image processing device according to the present invention will be described. FIG. 8 is a block diagram illustrating an example of minimal configurations of the color image processing device according to the present invention. The color image processing device according to the present invention includes: an object area detection means 81 (for example, the image information acquisition unit 110) that detects an object area which is an area to be subjected to image processing from an input image; a reflection component reconstruction means 82 (for example, the reflection information reconstruction unit 120) that calculates color information of the object area and a perfect diffusion component which is a low-frequency component of the object area and reconstructs a surface reflection component based on the color information and the low-frequency component (for example, excluding the low-frequency component from the color information); a surface reflection component correction means 83 (for example, the surface reflection component correction unit 130) that corrects the reconstructed surface reflection component according to the reference surface reflection component that is the surface reflection component set in advance according to the object area; and a reproduced color calculation means 84 (for example, the reproduced color calculation unit 140) that calculates a reproduced color obtained by correcting each pixel included in the input image using the perfect diffusion component and the corrected surface reflection component and generates an output image based on the reproduced color.

With such a configuration, it is possible to improve the texture of an object in a color image captured by a color imaging device at a low computation cost.

In addition, the color image processing device may include a correction value input means (for example, the user interaction unit 9) that receives a correction value (for example, an amount of the surface reflection component) that is information used when the surface reflection component is corrected from a user. At that time, the surface reflection component correction means 83 may correct the surface reflection component using the input correction value.

Furthermore, the surface reflection component correction means 83 may correct (for example, correct using Equation (3)) the pixel value of the surface reflection component according to a ratio (for example, a coefficient calculated by using Equation (2)) between a mean value of the surface reflection components included in the object area of the input image and a mean value of the reference surface reflection components.

In addition, the surface reflection component correction means 83 may correct the area of the surface reflection component so as to approach the area of the reference surface reflection component of the object area or the ratio of the area of the reference surface reflection component to the object area.

Specifically, the surface reflection component correction means 83 may perform a correction for decreasing the area of the surface reflection component by decreasing the pixel value of the surface reflection component included in the object are based on a predetermined rule (for example, a rule in which a pixel value is multiplied by a coefficient $\beta i$ for decreasing the amount (intensity) of the surface reflection component) and excluding pixels having pixel values that are below a threshold set in advance out of pixel values from the surface reflection component.

In addition, the surface reflection component correction means 83 may perform a correction for increasing the area of the surface reflection component by selecting pixels, which are adjacent to the surface reflection component, from among pixels that are not the surface reflection components based on a predetermined rule (for example, a rule of a random selection) and adding the selected pixels as the surface reflection components.

Although the present invention has been described with reference to the exemplary embodiments, the present invention is not limited to the exemplary embodiments described above. Various modifications which can be understood by one skilled in the art can be made in the configuration and details of the present invention within the scope of the present invention.

This application is based upon and claims the benefit of priority from Japanese patent application No. 2010-149234, filed on Jun. 30, 2010, the disclosure of which is incorporated herein in its entirety by reference.

INDUSTRIAL APPLICABILITY

The present invention can be suitably applied to functions to improve the image quality of an image that is input to color image input/output devices. Moreover, the present invention can be embodied as color correction software or utilities for optional color images by embodying the present invention in the form of a program running on a computer system.

REFERENCE SIGNS LIST

1: Input image
2: Output image
3: Object area detection unit
4: Object area low-frequency component calculation unit
5: Object area surface reflection component and perfect diffusion component calculation unit
6: Surface reflection component correction unit
7: Reference surface reflection component storing memory
8: Object area reproduced color calculation unit
9: User interaction unit
10: Slider bar
100, 101, 102: Color image processing device
110: Image information acquisition unit
120: Reflection information reconstruction unit
130: Surface reflection component correction unit
140: Reproduced color calculation unit

The invention claimed is:

1. A color image processing method comprising:
   detecting, by a processor, an object area which is an area to be subjected to image processing from an input image;
   calculating, by the processor, color information of the object area and a perfect diffusion component which is a low-frequency component of the object area;
   reconstructing, by the processor, a surface reflection component based on the color information and the low-frequency component;
   correcting, by the processor, the reconstructed surface reflection component according to a reference surface reflection component that is the surface reflection component set in advance according to the object area;
   calculating, by the processor, a reproduced color that is a color obtained by correcting each pixel included in the input image by using the perfect diffusion component and the corrected surface reflection component; and
   generating, by the processor, an output image based on the reproduced color,
   wherein a correction value that is information used when the surface reflection component is corrected is input from a user, and
   when the reconstructed surface reflection component is corrected, the surface reflection component is corrected using the input correction value.

2. The color image processing method according to claim 1, wherein, when the reconstructed surface reflection component is corrected, a pixel value of the surface reflection component is corrected according to a ratio between a mean value of the surface reflection components included in the object area of the input image and a mean value of the reference surface reflection components.

3. The color image processing method according to claim 1, wherein, when the reconstructed surface reflection component is corrected, an area of the surface reflection component is corrected so as to approach an area of the reference surface reflection component included in the object area or a ratio of the area of the reference surface reflection component to the object area.

4. The color image processing method according to claim 3, wherein, when the reconstructed surface reflection component is corrected, a correction for decreasing the area of the surface reflection component is performed by decreasing pixel values of the surface reflection component included in the object area based on a predetermined rule and excluding pixels having pixel values that are below a threshold that is set in advance out of the pixel values from the surface reflection component.

5. The color image processing method according to claim 3, wherein, when the reconstructed surface reflection component is corrected, a correction for increasing the area of the surface reflection component is performed by selecting pixels, which are adjacent to the surface reflection component, from among pixels that are not the surface reflection component based on a predetermined rule and adding the selected pixels as the surface reflection components.

6. A color image processing device comprising:
hardware, including memory and a processor;
an object area detection unit implemented at least by the hardware and that detects an object area which is an area to be subjected to image processing from an input image;
a reflection component reconstruction unit implemented at least by the hardware and that calculates color information of the object area and a perfect diffusion component which is a low-frequency component of the object area and reconstructs a surface reflection component based on the color information and the low-frequency component;
a surface reflection component correction unit implemented at least by the hardware and that corrects the reconstructed surface reflection component according to a reference surface reflection component that is the surface reflection component set in advance according to the object area;
a reproduced color calculation unit implemented at least by the hardware and that calculates a reproduced color that is a color obtained by correcting each pixel included in the input image by using the perfect diffusion component and the corrected surface reflection component and generates an output image based on the reproduced color;
a correction value input unit implemented at least by the hardware and that receives a correction value that is information used when the surface reflection component is corrected as an input from a user,
wherein the surface reflection component correction unit corrects the surface reflection component using the input correction value.

7. A non-transitory computer readable information recording medium storing a color image processing program, when executed by a processor, performs a method for:
detecting an object area which is an area to be subjected to image processing from an input image;
calculating color information of the object area and a perfect diffusion component which is a low-frequency component of the object area;
reconstructing a surface reflection component based on the color information and the low-frequency component;
correcting the reconstructed surface reflection component according to a reference surface reflection component that is the surface reflection component set in advance according to the object area;
calculating a reproduced color that is a color obtained by correcting each pixel included in the input image by using the perfect diffusion component and the corrected surface reflection component; and
generating an output image based on the reproduced color,
wherein a correction value that is information used when the surface reflection component is corrected is input from a user, and
when the reconstructed surface reflection component is corrected, the surface reflection component is corrected using the input correction value.

* * * * *